(No Model.)
A. HETTEL.
BAND SAW GUIDE.
No. 446,568. Patented Feb. 17, 1891.
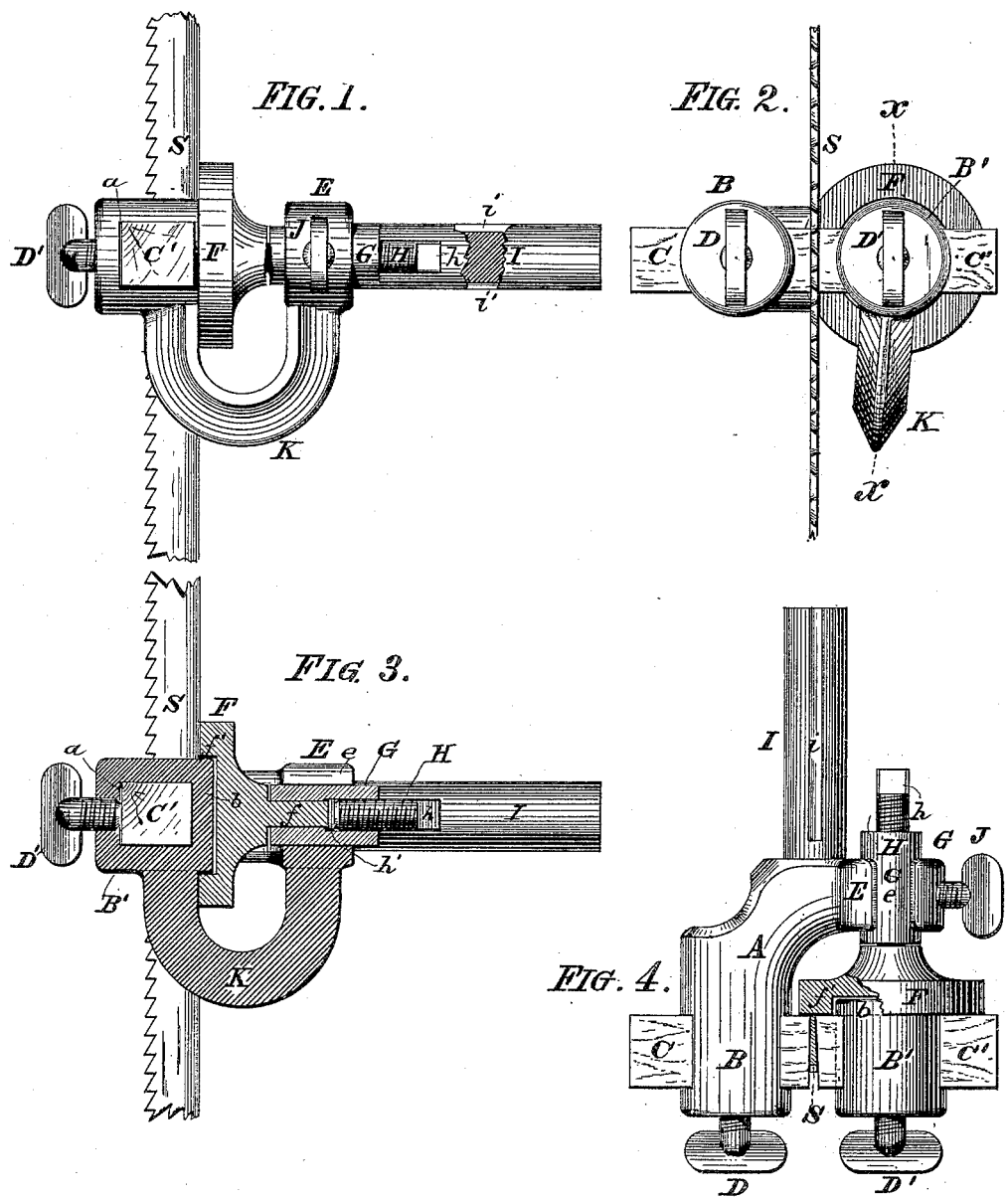
Witnesses:
Wm. O. Stark
Dentre S. Stark
Inventor:
Anthony Hettel,
by Michael J. & Wm. O. Stark,
Attorneys.

UNITED STATES PATENT OFFICE.

ANTHONY HETTEL, OF ROCHESTER, NEW YORK.

BAND-SAW GUIDE.

SPECIFICATION forming part of Letters Patent No. 446,568, dated February 17, 1891.

Application filed July 2, 1890. Serial No. 357,547. (No model.)

*To all whom it may concern:*

Be it known that I, ANTHONY HETTEL, of Rochester, in the county of Monroe and State of New York, have invented certain new and useful Improvements in Band-Saw Guides; and I do hereby declare that the following description of my said invention, taken in connection with the accompanying sheet of drawings, forms a full, clear, and exact specification, which will enable others skilled in the art to which it appertains to make and use the same.

This invention has general reference to improvements in band-saw guides; and it consists, essentially, in the novel and peculiar combination of parts and details of construction, as hereinafter first fully set forth and described, and then pointed out in the claims.

In the drawings already mentioned, which serve to illustrate my said invention more fully, Figure 1 is a side elevation of my improved band-saw guide. Fig. 2 is a front elevation of the same. Fig. 3 is a transverse sectional elevation in line $xx$ of Fig. 2. Fig. 4 is a plan.

Like parts are designated by corresponding letters of reference in all the figures.

The object of this invention is the production of an efficient guide for band-saws.

A is the body of the saw-guide. It consists of a cylindrical portion B, a cylindrical shank I, an open socket E, having a U-shaped yoke K, and a further cylindrical boss B', the latter being parallel and in line with the boss B, the whole being arranged in relation to one another, as clearly illustrated in the drawings.

Within the cylindrical bosses B B' are angular transverse openings $a$, Figs. 1 and 3, into which are placed hard-wood guide-pieces C C', adjustably held within said bosses by thumb or set screws D D'.

Within the open socket E is located a sleeve G, having within its bore a set-screw H, provided with a head $h$, by means of which it may be used for adjusting the bearing-wheel F, hereinafter to be referred to. This sleeve is preferably made from tool-steel properly hardened to prevent wear, and it is adapted to receive in its said bore a disk-wheel F by the shank or journal $f$, the end of which bears against the end of the set-screw H, already mentioned, hardened-steel washers $h'$ being interposed between the end of the journal and the end of the set-screw to reduce friction, if desired.

The face of the disk-wheel is recessed at $f'$ to receive the portion $b$ of the boss B, while the socket E is slotted at $e$ to enable the shank or journal of the disk-wheel F being placed in proper position.

The sleeve G is adjustably held in position within the socket E by a thumb or set screw J.

The saw S passes between the adjoining ends of the hard-wood guides C C' and bears with its back upon the face of the disk-wheel F, touching a portion thereof only. This disk-wheel will revolve with the saw by frictional contact therewith, and thereby receives the strain upon the saw when at work, so that but little power is lost in guiding said saw, while at the same time the saw is perfectly guided and will not heat to any extent.

The entire apparatus is held in the usual band-saw frame (not shown) by the shank I, the latter having two longitudinal grooves $i$ $i'$, into which set-screws may enter to prevent the saw-guide from turning, in a manner readily comprehended.

The disk-wheel F is by preference made from tool-steel suitably hardened to prevent wear as much as possible, while the body of the saw-guide may be readily produced in cast or malleable iron or steel. This disk-wheel is recessed in its face to allow a portion of the boss of the socket B', which retains the wooden guide-piece C', to enter. This construction I have adopted in order to bring the guide-pieces C C' into close proximity of the guide-wheel, whereby I am enabled to properly guide even the very narrowest of saws without making any specific adjustment for the same. In order to enable me to place the guide-wheel into or remove it from its position, I have slotted the socket E, so that by loosening the set-screw J, I may first pull out the sleeve G and then lift the guide-wheel vertically out of the socket, its journal $f$ passing through the slot $e$. To replace the same the order of manipulation is simply reversed. This construction is quite a feature of the device and contributes toward compactness and efficiency of the same.

The entire device is applicable on all kinds of band-saws without change or modification.

Having thus fully described my invention, I claim as new and desire to secure to me by Letters Patent of the United States—

1. As an improved article of manufacture, a band-saw guide consisting of the body A, having the boss B, socket E, with the yoke K and boss B', and the shank I, the disk-wheel F, having the journal $f$, the sleeve G, having the adjusting-screw H, and the two guide-pieces C C', as and for the object stated.

2. In an improved band-saw guide, the combination, with the body having the open socket E and set-screw J, of the sleeve G, having the set-screw H, and the guide-wheel F, having the journal $f$, revolving within said sleeve and bearing against the end of said set-screw, as and for the purpose stated.

3. The improved band-saw guide hereinbefore described, consisting of a body having on one end an angular socket provided with a set-screw, a curved middle portion terminating in an open socket having a set-screw, and a shank projecting rearwardly from said curved portion, said open socket having a U-shaped bracket terminating in an angular socket in line with the similar socket on the body and provided with a set-screw, side guides within said angular sockets, a tubular sleeve within the open socket having an adjusting-screw, as described, and a guide-wheel having a journal rotating within said sleeve and adapted to pass into the open socket by the slotted opening therein, as and for the object stated.

In testimony that I claim the foregoing as my invention I have hereto set my hand in the presence of two subscribing witnesses.

ANTHONY HETTEL.

Attest:
 GILBERT E. BENEDICT,
 BERNHARD LECHLEITER.